US012709402B2

(12) United States Patent
Freer

(10) Patent No.: US 12,709,402 B2
(45) Date of Patent: Aug. 18, 2026

(54) SYSTEM AND METHOD FOR OPERATING A HYBRID AIRCRAFT POWER PLANT

(71) Applicant: PRATT & WHITNEY CANADA CORP., Longueuil (CA)

(72) Inventor: Richard Freer, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/069,588

(22) Filed: Mar. 4, 2025

(65) Prior Publication Data

US 2025/0197018 A1 Jun. 19, 2025

Related U.S. Application Data

(62) Division of application No. 18/142,323, filed on May 2, 2023, now Pat. No. 12,263,953.

(51) Int. Cl.
*B64D 31/06* (2024.01)
*B64D 27/02* (2006.01)

(52) U.S. Cl.
CPC ............. *B64D 31/06* (2013.01); *B64D 27/02* (2013.01); *B64D 27/026* (2024.01)

(58) Field of Classification Search
CPC ....... B64D 31/06; B64D 27/02; B64D 27/026
See application file for complete search history.

(56) References Cited

U.S. PATENT DOCUMENTS

| | | | | |
|---|---|---|---|---|
| 9,623,978 | B2 | 4/2017 | Anton et al. | |
| 10,040,566 | B2 * | 8/2018 | Waltner | B60L 50/16 |
| 11,539,316 | B2 * | 12/2022 | Gemin | H02P 9/008 |

(Continued)

FOREIGN PATENT DOCUMENTS

| | | | |
|---|---|---|---|
| CA | 3132269 | A1 | 9/2020 |
| CA | 3132288 | A1 | 9/2020 |

(Continued)

OTHER PUBLICATIONS

Kelsey Reichmann, Airbus Moves Toward Hybrid Electric Helicopter with New Engine Backup System, Sep. 28, 2021, https://aviationtoday.com/2021/09/28/airbus-moves-toward-hybrid-electric-helicopter-new-engine-backup-system/, accessed Mar. 8, 2023.

(Continued)

*Primary Examiner* — David P. Olynick
(74) *Attorney, Agent, or Firm* — Norton Rose Fulbright Canada LLP

(57) ABSTRACT

Hybrid aircraft power plants are provided together with associated systems and methods for operating such hybrid aircraft power plants. A hybrid aircraft power plant includes a thermal engine, an electric motor and one or more controllers operatively connected to the thermal engine and to the electric motor. The thermal engine and the electric motor are drivingly connected to an air mover of an aircraft via a combining gear train. The one or more controllers are configured to govern an actual output torque of the electric motor to reduce an error between a target operating speed for the air mover and an actual operating speed of the air mover, and govern an output of the thermal engine to reduce an error between a target output torque for the electric motor and the actual output torque of the electric motor.

8 Claims, 7 Drawing Sheets

(56) References Cited

U.S. PATENT DOCUMENTS

| | | | | |
|---|---|---|---|---|
| 11,725,594 | B2 * | 8/2023 | McQuiston | F02K 3/04 60/773 |
| 2006/0225431 | A1 * | 10/2006 | Kupratis | F02C 3/10 60/39.24 |
| 2016/0052626 | A1 * | 2/2016 | Vander Mey | B64C 27/20 244/6 |
| 2018/0156107 | A1 * | 6/2018 | Naumanen | B60W 10/06 |
| 2018/0216526 | A1 | 8/2018 | Dalal | |
| 2018/0354631 | A1 | 12/2018 | Adibhatla | |
| 2018/0370646 | A1 * | 12/2018 | Hon | F02C 7/32 |
| 2020/0031480 | A1 | 1/2020 | Baig | |
| 2020/0083791 | A1 | 3/2020 | LaTulipe | |
| 2020/0277064 | A1 * | 9/2020 | Thomassin | H02P 29/028 |
| 2020/0298988 | A1 * | 9/2020 | LaTulipe | B64D 35/023 |
| 2020/0347743 | A1 | 11/2020 | Long | |
| 2020/0392860 | A1 | 12/2020 | Turner | |
| 2021/0039801 | A1 * | 2/2021 | Spierling | F02D 29/06 |
| 2021/0101691 | A1 | 4/2021 | Mark et al. | |
| 2022/0009615 | A1 | 1/2022 | Mark et al. | |
| 2022/0065177 | A1 | 3/2022 | McQuiston | |
| 2023/0047326 | A1 | 2/2023 | Freer | |
| 2023/0078649 | A1 | 3/2023 | Hettenkofer et al. | |
| 2023/0234715 | A1 | 7/2023 | Hickey | |
| 2023/0323788 | A1 * | 10/2023 | Vive | F02C 7/32 415/122.1 |

FOREIGN PATENT DOCUMENTS

| | | | |
|---|---|---|---|
| CA | 3119007 | A1 | 11/2021 |
| EP | 4032812 | A1 | 7/2022 |

OTHER PUBLICATIONS

European Patent Office, Communication re. European search report for European patent application No. 24173817.8, Oct. 2, 2024.

* cited by examiner

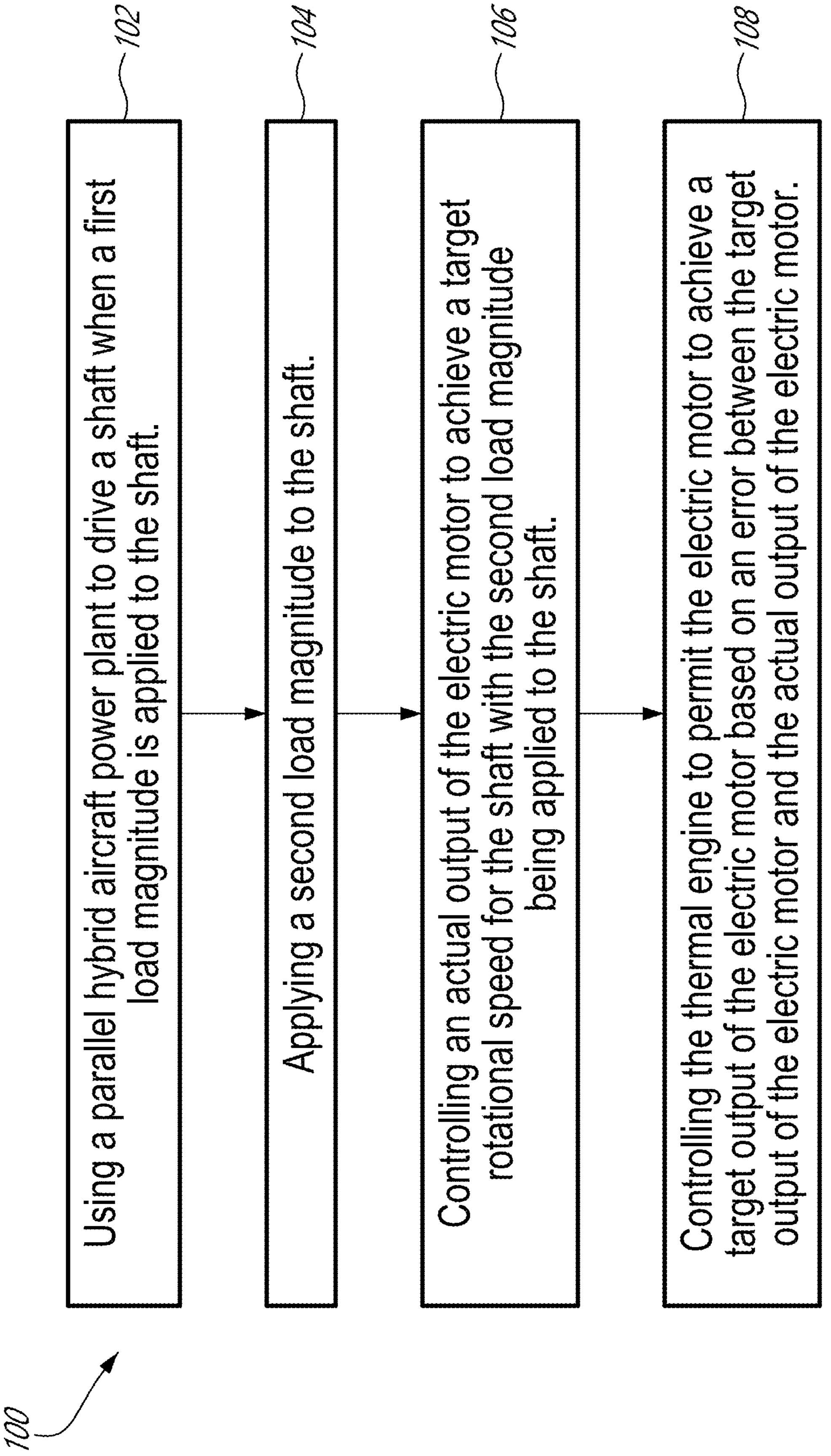

102: Using a parallel hybrid aircraft power plant to drive a shaft when a first load magnitude is applied to the shaft.

104: Applying a second load magnitude to the shaft.

106: Controlling an actual output of the electric motor to achieve a target rotational speed for the shaft with the second load magnitude being applied to the shaft.

108: Controlling the thermal engine to permit the electric motor to achieve a target output of the electric motor based on an error between the target output of the electric motor and the actual output of the electric motor.

| SOC | Target Motor Output 44B |
|---|---|
| SOC1 | Target1 |
| SOC2 | Target2 |
| SOC3 | Target3 |
| SOC4 | Target4 |

FIG. 6

SYSTEM AND METHOD FOR OPERATING A HYBRID AIRCRAFT POWER PLANT

CROSS REFERENCE TO RELATED APPLICATION

This is a division of U.S. patent application Ser. No. 18/142,323 filed on May 2, 2023, the entire contents of which are hereby incorporated herein by reference.

TECHNICAL FIELD

The disclosure relates generally to aircraft power plants, and more particularly to operating hybrid aircraft power plants.

BACKGROUND

Typically, a main rotor of a helicopter is driven by a gas turbine engine. Changing an amount of torque delivered to the main rotor by the gas turbine engine can be achieved by adjusting the fuel flow to the gas turbine engine. The rate of change in torque that can be delivered to the main rotor is limited by the responsiveness of the gas turbine engine. Improvement is desirable.

SUMMARY

In one aspect, the disclosure describes a method of operating a parallel hybrid aircraft power plant including an electric motor and a thermal engine cooperatively driving a shaft. The method comprises:

using the parallel hybrid aircraft power plant to drive the shaft when a first load magnitude is applied to the shaft;

applying a second load magnitude to the shaft, the second load magnitude being different from the first load magnitude;

controlling an actual output of the electric motor to achieve a target rotational speed for the shaft with the second load magnitude being applied to the shaft; and when the electric motor is being controlled to achieve the target rotational speed for the shaft with the second load magnitude being applied to the shaft, controlling the thermal engine to permit the electric motor to achieve a target output of the electric motor based on an error between the target output of the electric motor and the actual output of the electric motor.

In another aspect, the disclosure describes a system for controlling a hybrid power plant including an electric motor and a thermal engine drivingly connected to an air mover of an aircraft. The system comprising:

a first controller operatively connected to the electric motor of the hybrid power plant, the first controller being configured to control an actual output torque of the electric motor to achieve a target operating speed for the air mover; and a second controller operatively connected to the thermal engine of the hybrid power plant, the second controller being configured to control the thermal engine as a function of an error between a value indicative of a target output torque for the electric motor and a value indicative of the actual output torque of the electric motor.

In a further aspect, the disclosure describes a hybrid aircraft power plant comprising:

a thermal engine;

an electric motor, the thermal engine and the electric motor being drivingly connected to an air mover of an aircraft via a combining gear train; and one or more controllers operatively connected to the thermal engine and to the electric motor, the one or more controllers being configured to:

govern an actual output torque of the electric motor to reduce an error between a target operating speed for the air mover and an actual operating speed of the air mover; and govern an output of the thermal engine to reduce an error between a target output torque for the electric motor and the actual output torque of the electric motor.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a flow diagram of a method of operating a hybrid aircraft power plant;

FIG. 6 is a table of battery state of charge values with corresponding target motor output values to be produced by an electric motor of the hybrid power plant.

DETAILED DESCRIPTION

The present disclosure relates to hybrid aircraft power plants and methods for operating such hybrid aircraft power plants. In some embodiments, the hybrid power plant may be part of a relatively fast-reacting propulsion system of an aircraft. The hybrid power plant may have a parallel architecture including a thermal engine and an electric motor connected to drive an air mover of the aircraft via a common shaft cooperatively driven (e.g., directly or via a combining gear train) by the thermal engine and the electric motor. An output torque of the electric motor may be governed to reduce an error between a target operating speed of the air mover and an actual operating speed of the air mover. An output of the thermal engine may be governed to reduce an error between a target output torque of the electric motor and the actual output torque of the electric motor.

In some embodiments, the power plants and methods described herein may promote responsiveness in accommodating load changes on the air mover with reduced excursions from a target operating speed of the air mover. For example, in the event of a commanded load change (i.e., increase or decrease) on the air mover, the higher responsiveness of the electric motor may be used to promptly respond to the commanded load change while the lower responsiveness of the thermal engine may be used to gradually offload the electric motor and return to being dominant in driving the air mover. As a result, the overall responsiveness of the hybrid power plant may be improved to facilitate the execution of certain aircraft manoeuvres.

In some embodiments, the power plants and methods described herein may also promote control stability, reduced overshoot and/or steady-state error in the operating speed of the air mover. In some embodiments, the power plants and methods described herein may also be used to manage a state-of-charge (SOC) of a rechargeable electric power source used to drive the electric motor of the hybrid power plant.

The term "connected" may include both direct connection (in which two elements contact each other) and indirect connection (in which at least one additional element is located between the two elements). The term "substantially" may be applied to modify any quantitative representation which could permissibly vary without resulting in a change in the basic function to which it is related.

Aspects of various embodiments are described through reference to the drawings.

Figure 1:
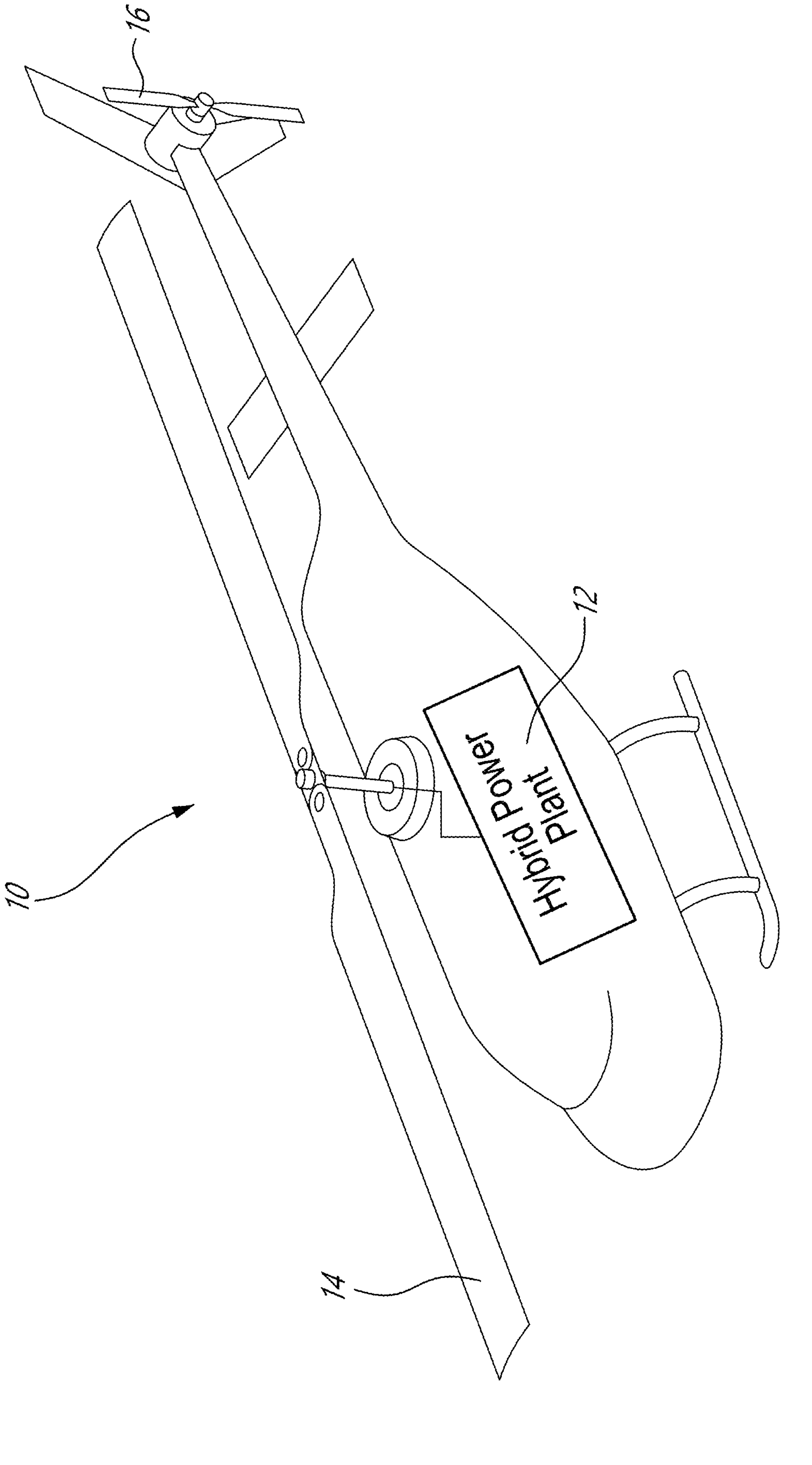
FIG. 1 is a perspective schematic view of an aircraft including a hybrid power plant as described herein.

FIG. 1 is a perspective schematic view of aircraft 10 including one or more hybrid power plants 12 (referred hereinafter in the singular as "power plant 12") as described herein. In some embodiments, aircraft 10 may be a helicopter including main rotor 14 and tail rotor 16. In various embodiments, aircraft 10 may be a fixed wing aircraft or other type of rotary wing aircraft. Power plant 12 may be operatively connected to drive main rotor 14 and/or tail rotor 16. Power plant 12 may be used to drive other types of rotatable air movers (e.g., propellers, fans and/or other bladed rotors) for propelling aircraft. Power plant 12 and associated methods may also be use in other (e.g., industrial) applications for driving an output shaft connected to another type of load.

Figure 2:
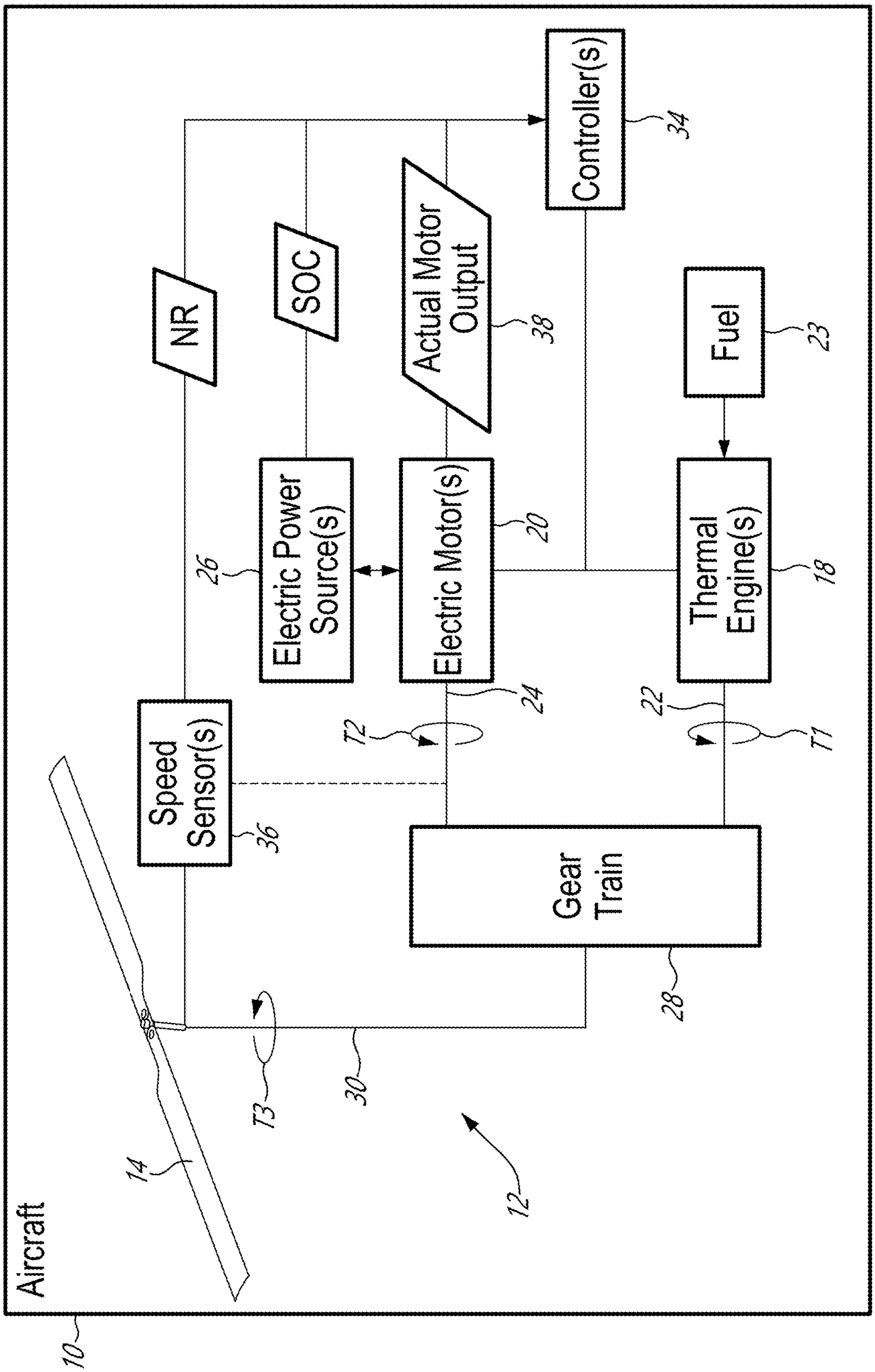
FIG. 2 is a schematic view of the aircraft of FIG. 1 with the hybrid power plant of FIG. 1.

FIG. 2 is a schematic view of aircraft 10 with power plant 12 being drivingly connected to main rotor 14 as a non-limiting example of a suitable air mover. Power plant 12 may include one or more thermal engines 18 (referred hereinafter in the singular) and one or more electric motors 20 (referred hereinafter in the singular). Thermal engine 18 may include a (e.g., continuous or intermittent) internal combustion engine. In various embodiments, thermal engine 18 may include a gas turbine engine, a rotary (e.g., Wankel) engine or a piston engine for example. Thermal engine 18 may generate first torque T1 at first shaft 22 from the combustion of a suitable fuel 23.

In various embodiments, electric motor 20 may be a permanent magnet synchronous motor or a brushless direct-current (DC) electric motor for example. Electric motor 20 may generate second torque T2 at second shaft 24 via the conversion of electric energy received from electric power source 26 (referred hereinafter as "power source 26"). Power source 26 may be a direct current (DC) electric source used to drive electric motor 20 via suitable power electronics (e.g., inverter) and motor controller. Power source 26 may include one or more batteries (e.g., battery bank) or super-capacitors for example. In some embodiments, power source 26 may be rechargeable. For example, the operation of electric motor 20 as an electric generator may be used to recharge power source 26 in some situations. In some embodiments, power plant 12 may be operated to manage SOC of power source 26 by the selective operation of electric motor 20 as a motor to draw energy from power source 26 or as a generator to input energy into power source 26 as explained below.

Thermal engine 18 and electric motor 20 may be drivingly connected to main rotor 14 in a parallel hybrid architecture. For example, thermal engine 18 and electric motor 20 may be drivingly connected to main rotor 14 via combining gear train 28 (referred hereinafter as "gear train 28") and third shaft 30. First shaft 22 and second shaft 24 may serve as separate inputs to gear train 28 so that power plant 12 may have a parallel hybrid architecture. Gear train 28 may be a suitable mechanical coupling that combines first torque T1 from thermal engine 18 with second torque T2 from electric motor 20 to provide output torque T3 for driving main rotor 14 via a common output such as third shaft 30. In some embodiments, gear train 28 may be a differential gear train configured to pool torques T1 and T2 and drive third shaft 30. Gear train 28 may be configured to permit main rotor 14 to be driven by either thermal engine 18 or electric motor 20, or, by both thermal engine 18 and electric motor 20 working together to cooperatively drive third shaft 30. In some embodiments, gear train 28 may include epicyclic gearing. In another parallel hybrid architecture embodiment shown in FIG. 5B for example, thermal engine 18 and electric motor 20 may be drivingly connected to main rotor 14 via a common (i.e., shared) shaft 31 that is driven by both thermal engine 18 and electric motor 20.

In reference to FIG. 2 again, in various modes of operation, gear train 28 may be configured to permit second torque T2 to be supplied from electric motor 20 to gear train 28 when electric motor 20 is operated as a motor, or may permit second torque T2 to be supplied from gear train 28 to electric motor 20 when electric motor 20 is operated as a generator. For example, electric motor 20 may smoothly switch between motoring and generating modes by changing the target output torque for electric motor 20. For example, this may be done by ramping down from a positive target output torque (i.e., motoring mode) through zero to a negative target output torque (i.e., generating mode), or vice versa.

In some embodiments, power plant 12 may include one or more controllers 34 operatively connected to thermal engine 18 and to electric motor 20. Controller(s) 34 may be configured to control the operation of thermal engine 18 and of electric motor 20 according to the methods described herein. In some embodiments, controller(s) 34 may receive feedback indicative of one or more process variables for the purpose of implementing one or more closed-loop control algorithms. For example, controller(s) 34 may be operatively connected to one or more speed sensors 36 (e.g., tachometer) (referred hereinafter in the singular) to receive operating (e.g., rotational) speed (NR) of main rotor 14 from speed sensor 36. In some embodiments, speed sensor 36 may instead or in addition sense an operating speed of electric motor 20 such as the rotational speed of second shaft 24, which may be related to the rotation speed of third shaft 30 (and optionally of main rotor 14) by a gear ratio between second shaft 24 and third shaft 30 provided by gear train 28. In some embodiments, the operating speed of electric motor 20 may be used in the methods described herein instead of or in addition to the operating speed NR of main rotor 14. In some embodiments, controller(s) 34 may be operatively connected to a battery management system associated with power source 26 to receive SOC of power source 26. In some embodiments, controller(s) 34 may be operatively connected to electric motor 20 or to other component associated with electric motor 20 to receive one or more signals indicative of actual motor output 38 indicative of an output (e.g., torque, power and/or current) of electric motor 20.

Figure 3:
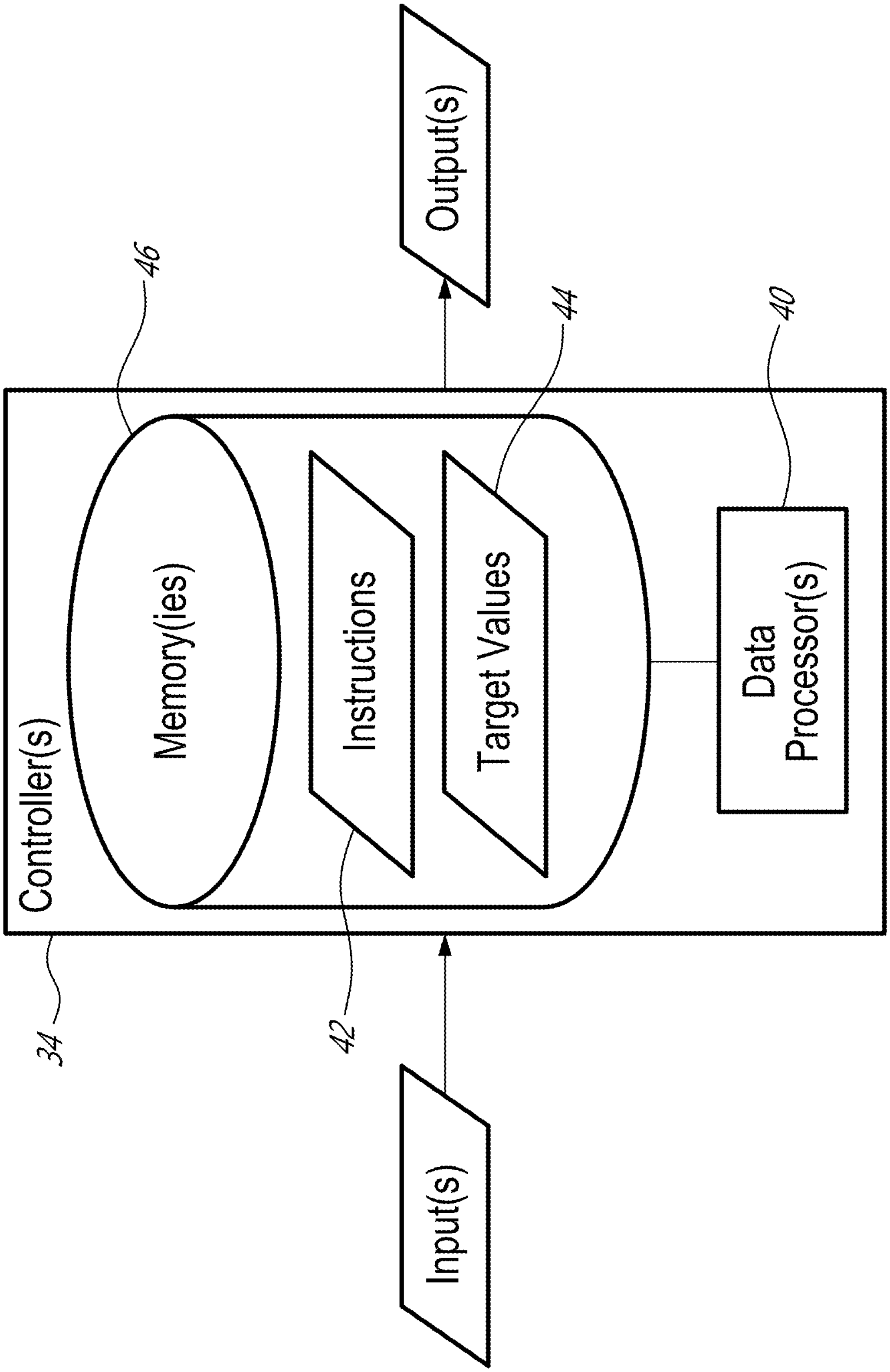
FIG. 3 is a schematic diagram of an exemplary controller of the hybrid power plant of FIG. 1.

FIG. 3 is a schematic diagram of exemplary controller(s) 34 of power plant 12. Controller(s) 34 may include one or more data processors 40 and non-transitory machine-readable memory(ies) 46. Controller(s) 34 may be configured to regulate the operation of power plant 12 and optionally also perform other tasks. Controller(s) 34 may receive input(s) such as operating speed NR of main rotor 14, SOC of power source 26 and actual motor output 38 to perform one or more procedures or steps defined by instructions 42 stored in memory 46 and executable by processor(s) 40 to generate one or more outputs. Controller(s) 34 may also make use of target values 44 to control the operation of power plant 12. Such target values 44 may include one or more target operating speeds 44A (shown in FIGS. 5A and 5B) of main rotor 14 and/or one or more target motor output 44B (shown in FIGS. 5A and 5B) produced by electric motor 20.

Processor(s) 40 may include any suitable device(s) configured to cause a series of steps to be performed by controller(s) 34 so as to implement a computer-implemented process such that instructions, when executed by controller(s) 34 or other programmable apparatus, may cause the functions/acts specified in the methods described herein to be executed. Processor(s) 40 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory(ies) 46 may include any suitable machine-readable storage medium. Memory(ies) 46 may include non-transitory computer readable storage medium such as, for example, but not limited to, an electronic, magnetic, optical, electromagnetic, infrared, or semiconductor system, apparatus, or device, or any suitable combination of the foregoing. Memory(ies) 46 may include any storage means (e.g. devices) suitable for retrievably storing machine-readable instructions executable by processor(s) 40.

FIG. 4 is a flow diagram of an exemplary method 100 of operating power plant 12 or other parallel hybrid aircraft power plants. Method 100 may be performed using power plant 12. For example, instructions 42 may be configured to cause controller(S) 34 to facilitate or perform some or all of method 100. Method 100 may include elements of power plant 12. In various embodiments, method 100 may include

- using power plant 12 to drive third shaft 30 when a first load magnitude is applied to third shaft 30 (block 102);
- applying a second load magnitude to third shaft 30, the second load magnitude being different from the first load magnitude (block 104);
- controlling an actual motor output 38 (e.g., second torque T2) of electric motor 20 to achieve target operating speed 44A (e.g., revolutions per minute) for third shaft 30 with the second load magnitude being applied to third shaft 30 (e.g., based on an error between target operating speed 44A for third shaft 30 and actual operating speed NR of third shaft 30; and/or based on an error between a target operating speed for the electric motor 20 and an actual operating speed of the electric motor 20) (block 106); and
- when electric motor 20 is being controlled to achieve target operating speed 44A for third shaft 30 with the second load magnitude being applied to third shaft 30, controlling thermal engine 18 to permit electric motor 20 to achieve target motor output 44B of electric motor 20 based on an error between target motor output 44B of electric motor 20 and actual motor output 38 (e.g., second torque T2) of electric motor 20 (block 108).

In some embodiments, method 100 may be used to drive main rotor 14 and/or other air mover(s) of aircraft 10. For example, third shaft 30 may be drivingly connected to main rotor 14 of a helicopter. Applying the second load magnitude to third shaft 30 may include changing a collective pitch of blades of main rotor 14 and/or changing an attitude of the helicopter. In the case of a helicopter, main rotor 14 may be driven to substantially maintain a constant speed even when the load on main rotor 14 is varied. Accordingly, in some embodiments of method 100, the same target operating speed 44A may be used to drive third shaft 30 when the first load magnitude is applied to third shaft 30 and when the second load magnitude is applied to third shaft 30.

In the method 100, actual motor output 38 (e.g., second torque T2) of electric motor 20 may be governed based on actual operating speed NR of third shaft 30 or other air mover to reduce (e.g., minimize) the error between target operating speed 44A and an actual operating speed NR. The output (e.g., first torque T1) of thermal engine 18 may be governed based on actual motor output 38 of electric motor 20 to reduce the error between target motor output 44B and actual motor output 38 of electric motor 20.

During steady state operation of power plant 12, thermal engine 18 may be dominant in driving third shaft 30 so that a majority, most or all of the energy required to drive third shaft 30 is provided by thermal engine 18. However, in the event of a load change on third shaft 30, electric motor 20 may relatively rapidly adjust its actual motor output 38 to maintain target operating speed 44A or to reach another target operating speed 44A. In the event of the load change, thermal engine 18 may still adjust its output by adjusting fuel flow but may do so at a lower rate than electric motor 20 due to the lower responsiveness of thermal engine 18 compared to electric motor 20. However, as thermal engine 18 adjusts its output, thermal engine 18 may gradually offload electric motor 20 and return to being dominant in driving third shaft 30. In embodiments where thermal engine 18 is a gas turbine engine, thermal engine 18 may be subjected to compressor surge limits, temperature limits, fuel flow limits and/or compressor speed limits, which may affect its responsiveness.

Electric motor 20 may have a higher responsiveness than thermal engine 18 by being able to adjust its torque output almost instantaneously, which means that method 100 may promote a high overall responsiveness of power plant 12 in accommodating load changes. In some embodiments, method 100 may help hinder a transient underspeed condition of main rotor 14 following rapid load increase on main rotor 14 (i.e., the second load magnitude being greater than the first load magnitude) by causing electric motor 20 to operate as a motor to drive main rotor 14 and provide a positive actual motor output 38. Since electric motor 20 may also be used as a generator to apply a load on main rotor 14 (i.e., provide a negative actual motor output 38), electric motor 20 may be used to apply a decelerating torque on main rotor 14 to help hinder a transient overspeed condition of main rotor 14 following rapid load decrease on main rotor 14 (i.e., the second load magnitude being smaller than the first load magnitude).

In some embodiments, method 100 may promote reduced overshoot margin and/or undershoot margin associated with target operating speed 44A. In some embodiments, a reduced overshoot margin may permit rotating components of gear train 28 and thermal engine 18 to operate at a higher speed for a given torque rating. In some embodiments, this could facilitate more thrust from main rotor 14, increased momentum in main rotor 14 to improve payload capacity when limited by autorotation performance, increased mechanical power capability of gear train 28, and increased mechanical power capability from thermal engine 18. In some embodiments, an improved shaft speed governing performance may also alleviate pilot workload due to the reduced risk of inadvertent overspeeding.

In some embodiments, a reduced undershoot margin may cause aircraft to feel more responsive to the pilot(s) and provide increased thrust more rapidly following a rapid increase in load on main rotor 14. In some embodiments, this can promote safer landings by reducing the risk of loss of thrust caused by a speed reduction of main rotor following sudden load increase (known as rotor droop) during a landing flare manoeuvre for example. In some embodiment, method 100 may make use of the relatively rapid torque response of electric motor 20 to improve the speed governing and stability of an air mover such as main rotor 14 of a helicopter, which can benefit aircraft handling and improve performance and utility in some modes of operation (i.e., in both emergency and non-emergency situations).

In embodiments where the power and energy capacity of power source 26 is relatively large and electric motor 20 is relatively powerful, and depending on the power requirements of aircraft 10, parameters (e.g., gains) of a control loop that adjusts the output of thermal engine 18 may be selected to make changes in power output from thermal engine 18 more gradual to promote engine life and reduce wear. On the other hand, in embodiments where the capacity of power source 26 is relatively small, parameters (e.g., gains) of the control loop that adjusts the output of thermal engine 18 may be selected to make changes in power output from thermal engine 18 more responsive. This may promote a reduced size and weight of power source 26 but may result in more aggressive power changes in the engine, which may accelerate wear on thermal engine 18.

Further aspects of method 100 are described below in relation to FIGS. 5A, 5B and 6.

Figure 5A:
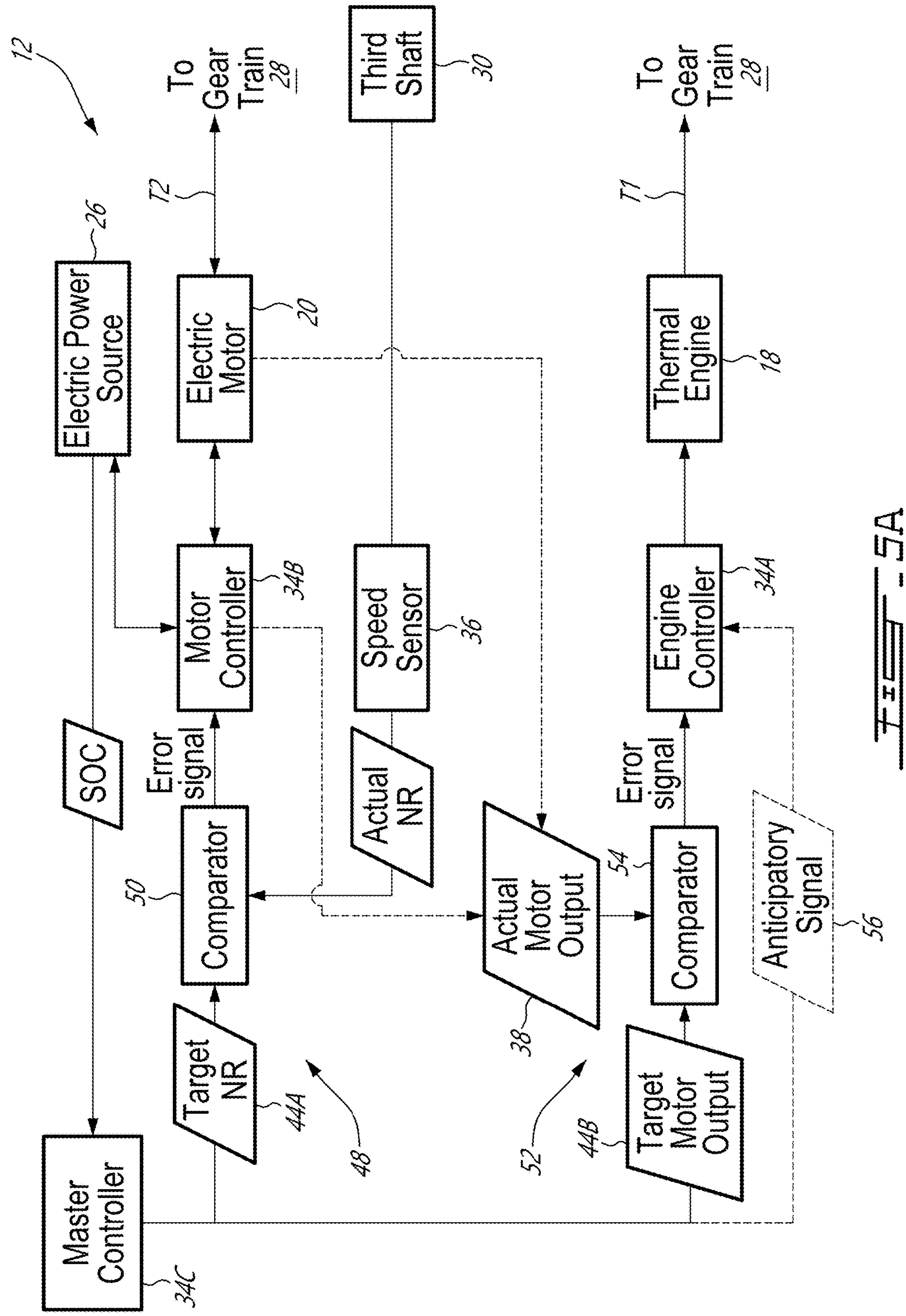
FIG. 5A is a schematic representation of an exemplary control system of the hybrid power plant of FIG. 1.

FIG. 5A is a schematic view of an exemplary implementation of a control system of power plant 12 that may be suitable for carrying out method 100. Electric motor 20 and thermal engine 18 may be drivingly connected in parallel to gear train 28 for driving third shaft 30, which may be drivingly connected to main rotor 14 and/or to other air mover(s) of aircraft 10. Control functions associated with power plant 12 may be implemented on a single computing device (i.e., computer) or multiple computing devices. For example, controller(s) 34 may include engine controller 34A, motor controller 34B and optional master controller 34C. Motor controller 34B may be operatively connected to electric motor 20 and part of a closed-loop (i.e., feedback) control algorithm in first control system 48. First control system 48 may receive a value indicative of target operating speed 44A of third shaft 30 or of main rotor 14 as a first set point and a value indicative of an actual operating speed NR of third shaft 30 or of main rotor 14 as first feedback. First control system 48 may determine an error between the first set point and the first feedback at comparator 50. Motor controller 34B may then control actual motor output 38 (e.g., second torque T2) of electric motor 20 as a function of (e.g., to reduce) the error between the first set point and the first feedback.

Engine controller 34A may be operatively connected to thermal engine 18 and part of a closed-loop (i.e., feedback) control algorithm in second control system 52. First control system 48 and second control system 52 may be interdependent so that the operation of first control system 48 may influence the operation of second control system 52 and vice versa. Second control system 52 may receive a value indicative of target motor output 44B for electric motor 20 as a second set point and a value indicative of actual motor output 38 (e.g., second torque T2, power, electric current) of electric motor 20 as second feedback. Second control system 52 may determine an error between the second set point and the second feedback at comparator 54. Engine controller 34A may then control thermal engine 18 as a function of (e.g., to reduce) the error between the second set point and the second feedback.

Actual motor output 38 may be a sensed or calculated value that is indicative of the actual (e.g., real-time) output of electric motor 20 being produced at the current time. In various embodiments, actual motor output 38 may be a magnitude of an electric current being delivered to electric motor 20, a magnitude of an electric current being generated by electric motor 20 when operating as a generator, a magnitude of second torque T2 being produced by electric motor 20 or a magnitude of the output power from electric motor 20. For example, the magnitude of the electric current being delivered to electric motor 20 may be indicative of torque T2 generated by electric motor 20. Target motor output 44B may be a corresponding target value that is suitable for comparison with actual motor output 38.

In embodiments where thermal engine 18 is intended to be dominant in driving third shaft 30 and electric motor 20 is mainly used to increase responsiveness during load changes, target motor output 44B may be relatively small so that once electric motor 20 is no longer required to maintain target operating speed 44A of third shaft 30, electric motor 20 may be offloaded by thermal engine 18 so that thermal engine 18 may be dominant in driving third shaft 30. In some situations where electric motor 20 is intended to be completely offloaded, target motor output 44B may be set to substantially nil (zero). In some situations where a minimal torque is to be maintained on electric motor 20 for taking-up gear backlash or for other (e.g., mechanical) reasons, target motor output 44B may be set to 10% or less (e.g., ≤5%, ≤8%, ≤10%) of a maximum continuous torque rating (i.e., rated torque) of electric motor 20. In some embodiments, target motor output 44B may be set to 2% or less (e.g., ≤1%, ≤2%) of the maximum continuous torque rating of electric motor 20. In some situations, target motor output 44B may be set to a value between −10% and +10% of the maximum continuous torque rating of electric motor 20. In some situations, target motor output 44B may be set to a value between 0% and +10% of the maximum continuous torque rating of electric motor 20. In some situations, target motor output 44B may be set to a value between −2% and +2% of the maximum continuous torque rating of electric motor 20. In some situations, target motor output 44B may be set to a value between 0% and +2% of the maximum continuous torque rating of electric motor 20.

In various modes of operation, electric motor 20 may be operated as a motor or as a generator depending on whether assistance from electric motor 20 is required to accommodate an increase or a decrease in load on third shaft 30. For example, electric motor 20 may be operated as a generator to slow third shaft 30 when target operating speed 44A is lower than actual operating speed NR. On the other hand, electric motor 20 may be operated as a motor to supplement thermal engine 18 in accelerating third shaft 30 when target operating speed 44A is higher than actual operating speed NR.

In some embodiments, the mode of operation of electric motor 20 may also be selected based on whether electric motor 20 should be used to deplete or recharge power source 26. For example, in some situations, it may be desirable that the SOC of power source 26 be less than maximum (e.g., <100%) to provide capacity for electric motor 20 to supply electricity to power source 26 when used as a generator to accommodate a load decrease on third shaft 30. On the other hand, it may be desirable that a minimum the SOC of power source 26 be maintained as a reserve permitting the use of electric motor 20 in the event of an emergency situation. The management of the SOC of power source 26 may be tied to flight/mission planning to ensure that there is sufficient energy in power source 26 to provide power to electric motor 20 or to other electric load(s) in the event of an emergency. Control laws responsible for the management of the SOC of power source 26 may be housed in master controller 34C or other controller(s) of power plant 12. In some embodiments, master controller 34C may be part of an avionics system of aircraft 10 and may be in communication with one or more components of power plant 12.

In order to manage the SOC of power source 26, target motor output 44B may be adjusted accordingly. For example, a positive target motor output 44B may be used when it is desired to operate electric motor 20 as a motor and a negative target motor output 44B may be used when it is desired to operate electric motor 20 as a generator. In the event of a negative target motor output 44B, thermal engine 18 may be required to output sufficient power to drive third shaft 30 and to drive electric motor 20 as a generator. In the event of a positive target motor output 44B, thermal engine 18 may be required to output less power to permit electric motor 20 to contribute in driving third shaft 30. In some embodiments, target motor output 44B may be determined by master controller 34C based on the SOC of power source 26.

For example, when the SOC of power source 26 is within a desired range or at a desired value, target motor output 44B for electric motor 20 may be set to nil, or to a small positive or negative value (e.g., between −2% and +2% of the maximum continuous torque rating) that may be required for mechanical or other reasons. When the SOC of power source 26 is higher than a desired range or a desired value, target motor output 44B for electric motor 20 may be positive to cause operation of electric motor 20 as a motor to drive third shaft 30 and deplete power source 26. When the SOC of power source 26 is lower than the desired range or the desired value, target motor output 44B for electric motor 20 may be negative to cause operation of electric motor 20 as a generator to charge power source 26.

When the SOC of power source 26 is outside of the desired range or away from the desired value, target motor output 44B for electric motor 20 may be set to a higher positive or negative value (e.g., ≤5%, ≤10%, ≤15% or ≤20% of the maximum continuous torque rating) in order to adjust the SOC of power source 26. In some situations, target motor output 44B may be set to a value between −10% and +10% of the maximum continuous torque rating of electric motor 20. In some situations, target motor output 44B may be set to a value between −20% and +20% of the maximum continuous torque rating of electric motor 20.

In order to improve the responsiveness of thermal engine 18, engine controller 34A may be informed of the estimated load on third shaft 30 and engine controller 34A may then take into account target motor output 44B and target operating speed NR and determine the power output that should be needed from thermal engine 18. Alternatively, master controller 34C may perform this calculation and inform engine controller 34A of the probable output from thermal engine 18 that would be required to achieve target motor output 44B. This information may then be used by engine controller 34A to begin reacting to load changes without having to wait for electric motor 20 to change its actual motor output 38. This may be useful in situations where sudden and/or large load increases are needed and either: electric motor 20 is limited in power output and cannot accommodate the load without assistance from thermal engine 18; or the SOC of power source 26 is too low to accommodate the load.

The load demand information may be shared with engine controller 34A before the load change actually occurs (i.e., load anticipation) and can enable the engine controller 34A to cause fuel flow to thermal engine 18 to be increased pre-emptively to partially compensate for the limited responsiveness of thermal engine 18. For example, anticipatory signal 56 may be provided to engine controller 34A. Anticipatory signal 56 may be generated by master controller 34C in response to a commanded change in load on third shaft 30 but before the change in load has been applied or has been reacted to by electric motor 20. The commanded change in load may be a commanded change in collective pitch of main rotor 14 or may be a commanded change in attitude of aircraft 10 for example. Anticipatory signal 56 may be indicative of the impending load change on third shaft 30. Upon receipt of anticipatory signal 56, the output of thermal engine 18 may begin its adjustment based on anticipatory signal 56 slightly in advance of the change in load being applied. In some embodiments, the aggressiveness applied in the adjustment of the output of thermal engine 18 may be based on the magnitude of the impending change in load on third shaft 30.

In some embodiments of method 100, electric motor 20 may automatically and rapidly compensate for a temporary excess power from thermal engine 18 that could potentially occur due to the reaction by thermal engine 18 to the anticipated load change. This may then allow for more aggressive load anticipation logic to be used for thermal engine 18 while still maintaining tight control over actual operating speed NR of third shaft 30.

In some embodiments of method 100, in the event of a non-availability of thermal engine 18, electric motor 20 may continue to drive third shaft 30 and perform its speed governing function within the limits of electric motor 20 and power source 26. In the event of a non-availability of electric motor 20 or of electric power from power source 26, thermal engine 18 may be controlled to automatically take over responsibility of the speed governing function within the limits of thermal engine 18. For example, engine controller 34A may monitor the status of electric motor 20 and associated components such as power source 26 via a direct communication link with motor controller 34B and a battery management system, via a link to master controller 34C, or via a link to aircraft avionics or a flight control computer of aircraft 10. In some embodiments, engine controller 34A may manage the transfer of the speed governing function from motor controller 34B to engine controller 34A by, for example: entering a shaft speed governing mode and commanding motor controller 34B to enter a torque governing mode; entering the shaft speed governing mode and commanding motor controller 34B to stop providing power to electric motor 20; or entering the shaft speed governing mode and commanding motor controller 34B to stop providing power to electric motor 20 and commanding contactors associated with power source 26 to open to disconnect power source 26.

In some embodiments of method 100, master controller 34C or other aircraft avionics may monitor the status of electric motor 20, motor controller 34B, power source 26, thermal engine 18 and engine controller 34A, and manage the transfer of the shaft speed governing function from motor controller 34B to engine controller 34A if needed. This may be done by commanding thermal engine 18 to enter the shaft speed governing mode and commanding electric motor 20 to enter a torque governing mode, by commanding thermal engine 18 to enter the shaft speed governing mode and causing electric power to stop being provided to electric motor 20, or by commanding thermal engine 18 to enter the shaft speed governing mode and causing electric power to stop being provided to electric motor 20 and causing contactors associated with power source 26 to open to disconnect power source 26.

Figure 5B:
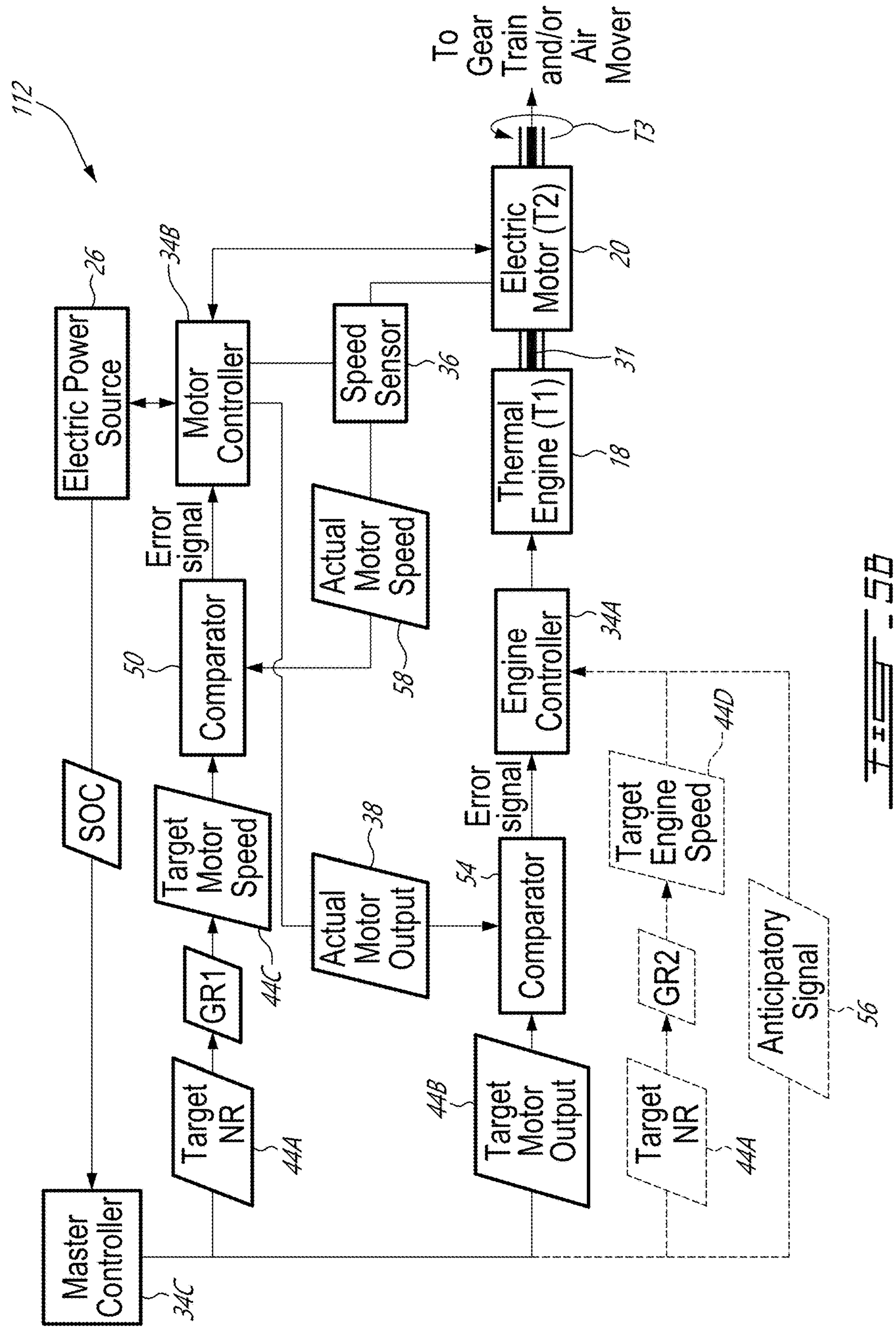
FIG. 5B is a schematic representation of another control system of another exemplary hybrid power plant.

FIG. 5B is a schematic representation of another control system of another exemplary hybrid power plant 112. Power plant 112 may have the same overall functionality as power plant 12 and may be used to carry out embodiments of method 100. Power plant 112 may include elements of power plant 12 previously described above. Like elements are identified using like reference numerals. Aspects of power plant 112 may be combined with aspects of power plant 12, and vice versa. Differences between power plant 12 and power plant 112 are described below.

In contrast with power plant 12, electric motor 20 of power plant 112 may be governed based on the operating (e.g., rotational) speed (e.g., revolutions-per-minute) of electric motor 20 instead of being governed based on the operating speed NR (e.g., revolutions-per-minute) of main rotor 14 or other air mover. For example, target operating speed 44A of main rotor 14 may be received and converted to target motor speed 44C using an applicable gear ratio GR1 of one or more gear trains operatively disposed between electric motor 20 and main rotor 14. Instead of sensing the operating speed of main rotor 14, speed sensor 36 may sense actual motor (operating) speed 58. Target motor speed 44C and actual motor speed 58 may be compared at comparator 50 to produce an error signal that is used by motor controller 34B to control actual motor output 38 of electric motor 20. Motor controller 34B may operated with the objective of reducing or eliminating the error represented by the error signal. In some embodiments, controlling electric motor 20 based on actual motor speed 58 instead of having to sense actual operating speed NR of main rotor 14 may improve reliability.

In various embodiments of power plant 12 and of power plant 112, different parallel hybrid architectures may be used. For example, as shown in FIG. 5B, thermal engine 18 and electric motor 20 may be connected to drive an air mover of the aircraft by cooperatively driving the same common shaft 31 so that combining gear train 28 may not be required. In some embodiments, common shaft 31 may be connected to main rotor 14 or other air mover without a speed-changing gear train. In some embodiments, common shaft 31 may be connected to main rotor 14 or other air mover via a suitable speed-reducing or speed-augmenting gear train. In some embodiments, electric motor 20 may be disposed between thermal engine 18 and the air mover so that common shaft 31 extends through electric motor 20. In some embodiments, thermal engine 18 may be disposed between electric motor 20 and the air mover so that common shaft 31 extends through thermal engine 18. Common shaft 31 to be driven by either thermal engine 18 or electric motor 20, or, by both thermal engine 18 and electric motor 20 working together to cooperatively drive common shaft 31.

In the event of a non-availability of electric motor 20 or of electric power from power source 26, thermal engine 18 may be controlled to automatically take over responsibility of the speed governing function within the limits of thermal engine 18. For example, target operating speed 44A of main rotor 14 may be received and converted to target engine speed 44D using an applicable gear ratio GR2 of one or more gear trains operatively disposed between thermal engine 18 and main rotor 14. Target engine speed 44D and the actual engine speed may be compared at a suitable comparator (not shown) to produce an error signal that is used by engine controller 34A to control thermal engine 18.

Similarly to power plant 12, power plant 112 may also make use of the load anticipation via anticipatory signal 56 to improve the ability of thermal engine 18 to accommodate load changes.

FIG. 6 is a table of SOC values associated with corresponding values of target motor outputs 44B. The information in FIG. 6 may have the form of a look-up table that is stored in memory 46 (shown in FIG. 3) and that may be used by master controller 34C for the purpose of selecting an appropriate target motor outputs 44B for use in second control system 52 based on the SOC of power source 26.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A system for controlling a hybrid power plant including an electric motor and a thermal engine drivingly connected to an air mover of an aircraft, the system comprising:

a first control system for the electric motor of the hybrid power plant, the first control system including a first controller operatively connected to the electric motor of the hybrid power plant, the first controller being configured to control an actual output torque of the electric motor to reduce a first error between a target operating speed for the air mover and an actual operating speed for the air mover; and a second control system for the thermal engine of the hybrid power plant and configured to receive a value indicative of the actual output torque of the electric motor when the first controller is controlling the actual output torque of the electric motor and a value indicative of a target output torque for the electric motor, the second control system including a second controller operatively connected to the thermal engine of the hybrid power plant, the second controller being configured to:

when the electric motor is driving the air mover and the actual output torque of the electric motor controlled by the first controller is greater than the target output torque for the electric motor, control the thermal engine to reduce a second error between the target output torque for the electric motor and the actual output torque of the electric motor to offload the electric motor in driving the air mover.

2. The system as defined in claim 1, wherein the value indicative of the target output torque for the electric motor is based on a state of charge of a battery used to drive the electric motor.

3. The system as defined in claim 2, wherein the first controller is configured to cause the electric motor to operate as a generator and charge the battery when the state of charge of the battery is lower than a desired state of charge for the battery.

4. The system as defined in claim 1, wherein the first controller is configured to cause the electric motor to operate as a generator when the target operating speed is lower than an actual operating speed of the air mover.

5. The system as defined in claim 1, wherein the second controller is configured to:

receive an anticipatory signal indicative of an impending load change on the air mover; and adjust an output of the thermal engine based on the signal.

6. A hybrid aircraft power plant comprising:

a thermal engine;

an electric motor, the thermal engine and the electric motor being drivingly connected to an air mover of an aircraft via a combining gear train; and one or more controllers operatively connected to the thermal engine and to the electric motor, the one or more controllers being configured to:

when the electric motor is driving the air mover and an actual output torque of the electric motor is governed to reduce a first error between a target operating speed for the air mover and an actual operating speed of the air mover:

determine a second error between a target output torque for the electric motor and the actual output torque of the electric motor, the actual output torque of the electric motor being greater than the target output torque for the electric motor; and govern an output of the thermal engine to reduce the second error between the target output torque for the electric motor and the actual output torque of the electric motor to offload the electric motor in driving the air mover.

7. The hybrid aircraft power plant as defined in claim 6, wherein the one or more controllers are configured to determine the target output torque based on a state of charge of a battery for powering the electric motor.

8. The hybrid aircraft power plant as defined in claim 6, wherein the one or more controllers are configured to cause the electric motor to operate as a generator to slow the air mover when the target operating speed for the air mover is lower than the actual operating speed of the air mover.

* * * * *